United States Patent [19]

Hampel et al.

[11] Patent Number: 4,516,790
[45] Date of Patent: May 14, 1985

[54] SLIDE ADJUSTMENT MEMBER FOR A VEHICLE TOWBAR

[75] Inventors: Lawrence E. Hampel, St. Charles; Edward O. Freese, North Aurora, both of Ill.

[73] Assignee: Moline Corporation, St. Charles, Ill.

[21] Appl. No.: 437,350

[22] Filed: Oct. 28, 1982

[51] Int. Cl.$^3$ .............................................. B60D 1/14
[52] U.S. Cl. .................................... 280/502; 280/505
[58] Field of Search .............................. 280/502, 505; 248/225.4, 246, 297.5; 224/42.03 R

[56] References Cited

U.S. PATENT DOCUMENTS

| | | | |
|---|---|---|---|
| 2,435,813 | 2/1948 | Williams | 280/505 |
| 2,628,750 | 2/1953 | Palmer | 224/42.03 A |
| 2,746,771 | 5/1956 | Gross | 280/502 |
| 3,374,011 | 3/1968 | Schipper | 280/478 R |
| 3,472,529 | 10/1969 | Gal | 280/491 E |
| 3,806,162 | 4/1974 | Milner | 280/502 |
| 4,027,894 | 6/1977 | Hawkins | 280/502 |

Primary Examiner—Joseph F. Peters, Jr.
Assistant Examiner—Donn McGiehan
Attorney, Agent, or Firm—Kinzer, Plyer, Dorn & McEachran

[57] ABSTRACT

A vehicle towbar assembly includes a pair of face plates fastened to the towbar frame and abutting the front bumper of a towed vehicle. A slide adjustment member secured to the face plate rests on the top of the bumper to hold the towbar frame up. Tow chains are used to secure the vehicle frame to the towbar frame. The slide adjustment member has a body portion and a T-shaped slot defined by a pair of fingers which extend from the body portion of the adjustment member. The face plate is disposed within the slot with the fingers encompassing the face plate. When the slide adjustment member is substantially perpendicular to the face plate, the adjustment member will readily slide up and down on the face plate. When the slide adjustment member is canted on the face plate, the face plate will bind in the slide and remain in a fixed position.

4 Claims, 5 Drawing Figures

SLIDE ADJUSTMENT MEMBER FOR A VEHICLE TOWBAR

SUMMARY OF THE INVENTION

This invention relates to a towbar assembly and is particularly concerned with an adjustable slide member for supporting the towbar frame on the bumper of a towed vehicle.

A primary object of the present invention is a slide adjustment member which supports a towbar frame and is readily positionable to fit any size bumper at any height.

Another object is a slide adjustment member for a towbar which eliminates the need for set screws or other fastening means.

Another object is a slide adjustment member for a towbar which is simple in design and easy to manufacture.

Another object is a slide adjustment member for a towbar which will not damage the bumper surfaces of a towed vehicle.

Another object is a slide adjustment member for a towbar which can be temporarily retained in position until the towbar is mounted on a towed vehicle.

Other objects will appear from time to time in the following specification, drawings and claims.

DESCRIPTION OF A PREFERRED EMBODIMENT

Figure 1:
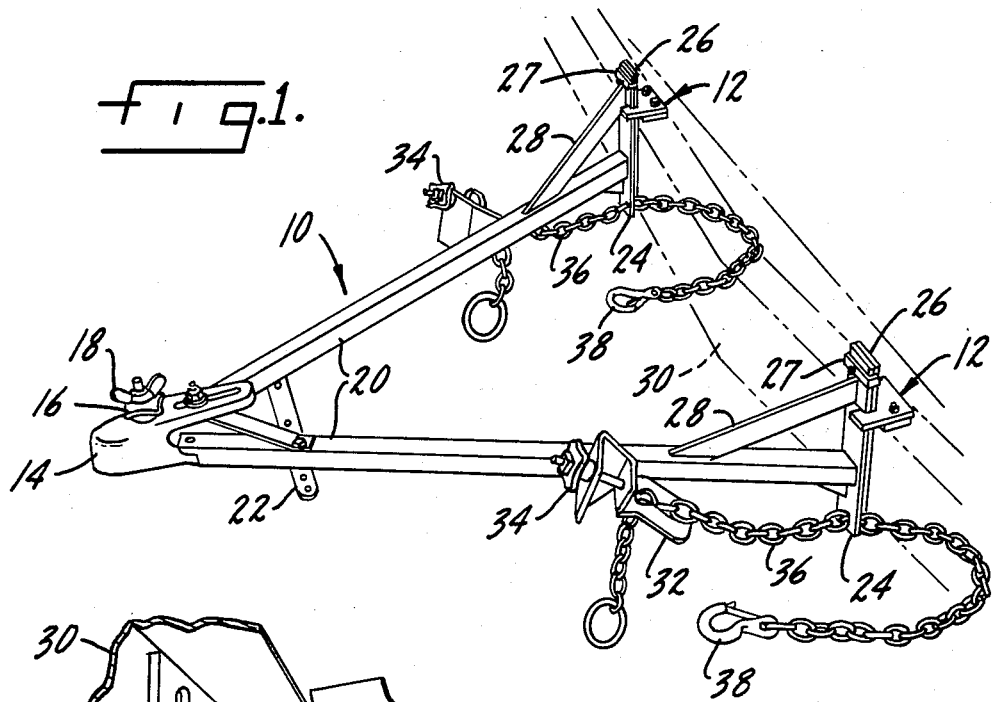
FIG. 1 is a perspective view of a towbar assembly.

A towbar assembly 10 is supported on a bumper of a towed vehicle by the slide adjustment member 12 of the present invention. The towbar 10 includes a coupler head 14 having a locking knob 16 and wing nut 18. The coupler head fits over the ball of a trailer hitch on the back of the towing vehicle. A pair of channel arms 20 are pivotally connected to the coupler head 14. An antispread bar 22 is attached between the channel arms and is adjustable to vary the angle between the arms. Located at the end of each channel arm 20 is a face plate 24. A rubber face pad 26 is attached to the outer surface of the face plate 24. A stop 27 retains the adjustment member 12 on the face plates. The face plates are strengthened by braces 28. Together the channel arms 20, the coupler knob 14 and the face plates 24 comprise the towbar frame. The frame is supported on the bumper of a towed vehicle by the slide adjustment members 12 which are secured to the face plates 24 in a manner which will be explained below. The bumper is shown at 30.

Each of the channel arms 20 carries a chain clamp 32. The chain clamp is welded or otherwise secured to the channel arm. A chain clamp locking device 34 provides a means for tightening the chains after they have been attached to the towed vehicle. The tow chains themselves are shown at 36. The tow chains extend through an opening in the bottom of the face plates 24 and have a hook 38 at one end.

Figure 2:
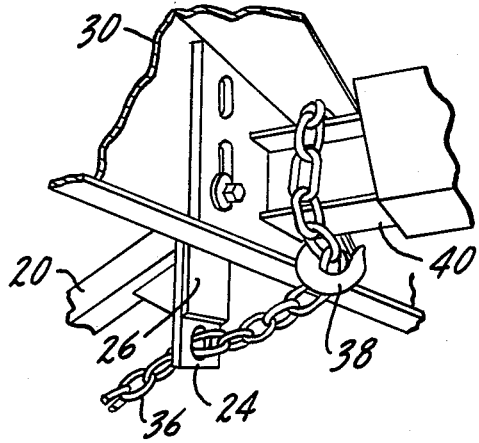
FIG. 2 is a perspective view of the underside of the interior of a bumper, showing the attachment of the tow chain to the bumper support.

FIG. 2 illustrates the attachment of the tow chains to the towed vehicle. The chains 36 are passed underneath the bumper 30 and wrapped around the bumper brackets 40 or a portion of the frame of the towed car. The chain is secured by inserting the chain links through the hook 38. Once this is done the chains are pulled taut by tightening the chain clamps 34.

Figure 3:
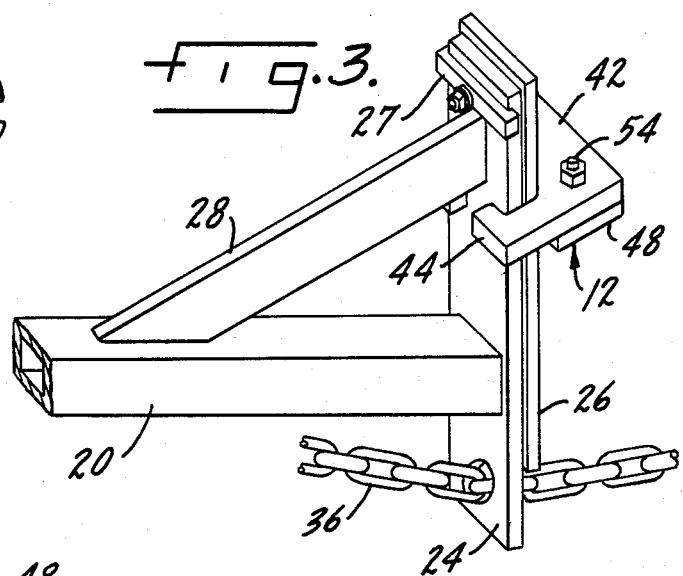
FIG. 3 is a perspective view of the towbar face plate and the slide adjustment member on the face plate.
Figure 4:
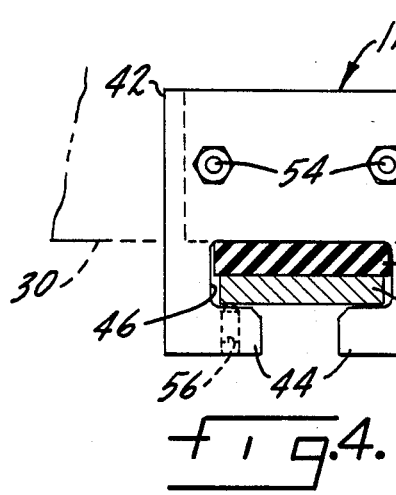
FIG. 4 is a plan view of the slide adjustment and a towbar face plate.
Figure 5:
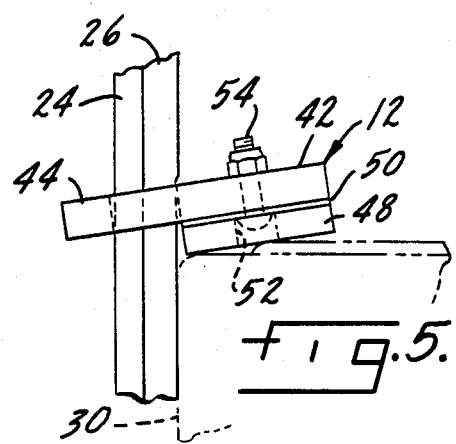
FIG. 5 is a side elevation view of a slide adjustment member and towbar face plate.

Further details of the towbar and in particular the slide adjustment member 12 can be seen in FIGS. 3-5. The slide adjustment member 12 has a generally rectangular body portion 42. Extending from the body portion are two L-shaped fingers 44. The fingers face each other and have a gap between them. The fingers define a T-shaped slot 46. When the slide adjustment member 12 is positioned on the face plate 24, the fingers encompass the face plate such that the face plate 24 and face pad 26 are disposed within the slot 46. The slide adjustment member also has a flexible pad 48 attached to the body portion 42. The pad 48 may be made of SBR (styrene butadiene rubber) of 60 durometer. In a preferred embodiment the pad 48 is adhesively bonded to a mounting plate 50 (FIG. 5). The pad has two holes 52 which accommodate the heads of mounting bolts 54. The heads of the bolts actually rest on the mounting plate 50 and not on the pad 48.

One of the fingers 44 may include a threaded opening in which a small spring plunger 56 is threaded (FIG. 4).

The use, operation and function of the slide adjustment member of the present invention are as follows. When the towbar frame is initially assembled, the slide adjustment member 12 is placed over the top of the face plate before the stop 27 is attached to the plate. The slide adjustment member is arranged so that the face plate is disposed in the slot 46 between the fingers 44. The gap between the fingers allows the adjustment member to clear the brace 28. After the slide adjustment member 12 is put on the face plate, the stop 27 is then bolted in place so that the slide member cannot be removed from the top of the towbar frame.

To install the towbar, the channel arms are first spread to a width approximating the distance between the front bumper brackets of the towed vehicle. Once this is done the antispread bar 22 is tightened to fix the angle between the channel arms 20. Next the user holds the towbar level with the bumper. With the tow chains 36 even with the bottom of the bumper, the slide adjustment member 12 is set down on the top of the bumper. The slide adjustment member is constructed so that when it is substantially perpendicular to the face plate 24, the adjustment member will readily slide up and down on the face plate in the slot 46. So it is a simple matter for the user to hold the slide member 12 such that it moves freely into position on top of the bumper. With the pad 48 of the slide member resting on the bumper, the fingers 44 are set so the slide member is at an angle to the face plate (see FIG. 5). This causes the face plate to bind in the slot 46 so it will not move relative to the slide adjustment member. The rubber pad 26 assists in gripping the slide member so it will bind when desired. This feature allows the slide adjustment member to be easily moved up or down as required and then set in a fixed position without the use of any clamps or bolts.

Once the towbar has been set in an initial position as described, the tow chains are wrapped tightly around the car's frame or the bumper brackets as shown in FIG. 2. The hook 38 retains the chain in position on the bumper brackets and the clamp locking knob 34 is used to pull the chain taut. Then the coupler head is dropped over a ball (not shown) on the towing vehicle and the coupler locking nut and wing nut are secured. The tow chains are then given a final tightening at the chain clamp locking knob 34. The final step is to pull each channel arm and face plate up so that the tow chain is tight against the bottom of the bumper. At the same time the slide adjustment member is pushed down tight against the top of the bumper. The slide adjustment member of the present invention is especially advantageous in this final tightening procedure where frequently only a small adjustment is necessary and working with set screws or the like would be quite cumbersome. With the slide member of this invention, the user need only adjust the member so that it is substantially perpendicular to the face plate and then it will move easily. Resetting the slide member is a simple matter of setting the member at an angle to the face plate so that it will bind in the slot.

Both the face plate and the slide adjustment member have rubber pads which prevent marring the surface of the bumper on the towed vehicle. The spring plunger 56 is provided as a supplementary, temporary holding device which may be used to hold the slide member in a desired position when the towbar is in storage. The actual position of the slide member for a certain towed vehicle may be known and if the user wishes to retain the slide member in that position after he has removed the towbar from the towed vehicle, he may use the spring plunger 56 to do that.

We claim:

1. In a towbar assembly of the type having a coupler head, a pair of channel arms each pivotally connected at one end to the coupler head, a vertically-disposed face plate connected to each of the other ends of the channel arms, and tow chains secured to the channel arms, the improvement comprising a slide adjustment member associated with each face plate, each slide adjustment member having a body-portion and a slot defined by a pair of fingers, the face plate being disposed within the slot with the fingers encompassing the face plate such that when the slide adjustment member is substantially perpendicular to the face plate the adjustment member will readily slide up and down on the face plate whereas when the slide adjustment member is disposed at an angle to the face plate the adjustment member will bind on the face plate and remain fixed.

2. The structure of claim 1 further comprising a flexible pad attached to the body portion of the slide adjustment member.

3. The structure of claim 2 wherein the flexible pad is adhesively bonded to a backing plate and the backing plate is attached to the slide adjustment member.

4. The structure of claim 1 further comprising a spring plunger in one of the fingers of the slide adjustment member, the spring plunger being employed to temporarily hold the adjustment member in position on the face plate prior to mounting of the towbar on a towed vehicle.

* * * * *